Figure 1:
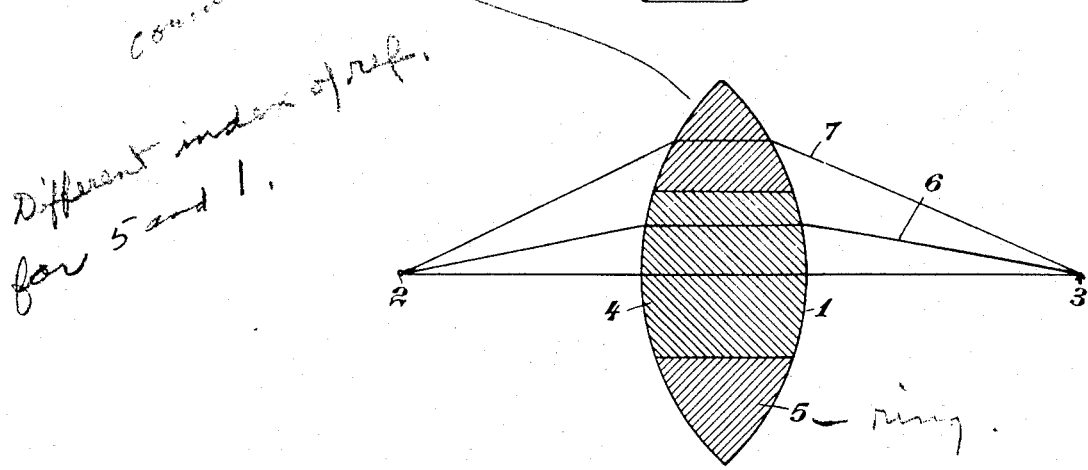

Jan. 16, 1934.  W. EWALD  1,943,521

LENS FOR OPTICAL PURPOSES

Filed Nov. 3, 1932

INVENTOR
Waldemar Ewald
BY Gifford, Scull & Burgess
ATTORNEYS.

Patented Jan. 16, 1934

1,943,521

UNITED STATES PATENT OFFICE 1,943,521

LENS FOR OPTICAL PURPOSES

Waldemar Ewald, Berlin-Lichterfelde-Ost, Germany, assignor to Siemens & Halske, Aktiengesellschaft, Siemensstadt, near Berlin, Germany, a corporation of Germany Application November 3, 1932, Serial No. 640,921, and in Germany October 30, 1931

1 Claim. (Cl. 88—57)

The invention relates to improvements in lenses for optical purposes.

The object of the invention is to provide simple and inexpensive means for obtaining clearly defined images on the screen.

It is well known that the rendition of images in apparatus designed to project pictures, such as scenes, portraits and other subjects on screens, depends to a great extent, particularly in the case of pictures on lenticulated films, on the quality of the system for directing the light through the film gate. The film gate opening should not only be lighted up uniformly as regards the area, but the cones of light emanating from any point of the opening should also have the same brightness in all directions. As lenses and mirrors of very large aperture are preferably made use of in projection optical systems, an apparent shading takes place towards the border or edge of the opening due to strong spherical aberration of the lenses. In order to attain uniform lighting it is therefore necessary to strongly overdimension the source of light as regards the area as well as the angle of radiation, which involves undesirable losses of light.

According to the invention the lenses are composed or built up of constituents of different refraction, these constituents penetrating one another in such a manner that the boundary surfaces are substantially located in the direction of the path of the rays. It is known to secure together lenses having different refraction or refractive indices in order to use them as glasses for spectacles and the like at different distances, at the same time. These lenses are, however, cemented together along optically active surfaces. It has also been suggested to cut a hole in the center of a lens and to place another lens of entirely different focal length into it. In the lenses according to the invention aberration errors are avoided and the boundary surfaces between the individual constituent parts are not formed by optical surfaces. In this way the manufacture of the lens is considerably facilitated, and it is without great difficulty possible to bring about that the optical axes of the individual parts coincide exactly as regards direction. The lenses according to the invention may also be further corrected by the application of known means. The lenses may consist of glass throughout or of other suitable materials.

Two embodiments of my invention are by way of example illustrated in the drawing affixed to my specification and forming part thereof. In the drawing is:

Fig. 1, an axial section through my improved lens, and

Figure 2:
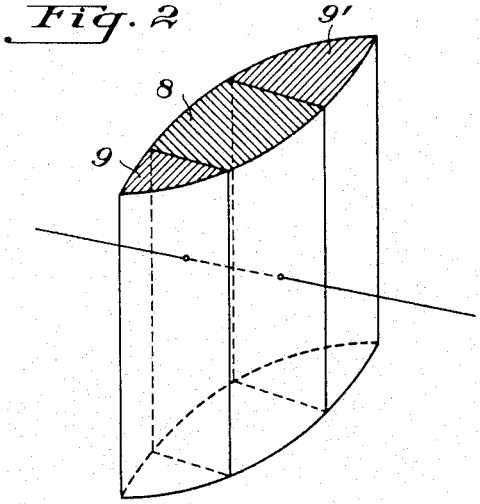

Fig. 2, an improved cylindrical lens in perspective view.

Referring to Fig. 1 of the drawing the lens should image the point 2 at the point 3. At the point 2 a source of light may be assumed, and the point 3 may be assumed to be located in the center of a gate opening. It is, however, also possible that the points 2 and 3 only represent real or virtual images of light source and gate opening so that in the complete optical system there exist further lenses or mirrors apart from the lens 1. The lens 1 consists of a central portion 4 and a ring 5.

The boundary surfaces may, as in the illustration, form a cylindrical shell or the shell of a truncated cone. The refractions of the two parts are so determined that the two rays 6 and 7 which both traverse the central and the peripheral part at about half the height, pass accurately through the point 3.

Fig. 2 of the drawing shows a cylindrical lens which also incorporates my invention, inasmuch as this lens consists of three zones which have different refractions. The zones here run parallel to that plane which is determined by the optical axis and the direction of the shell or envelope line of the cylinder. The zones may also be arranged in the manner of wedges. The central zone 8 consists of a glass having higher refraction than the glass of which the lateral zones 9 and 9' are constructed. It will be observed that the outer surfaces of two adjacent parts form a continuous smooth surface without any edges or corners.

The production of the lenses may take place in such a way that, for instance, in the manufacture of spherical lenses a circular opening is cut or drilled into a suitable piece of glass and this hole is filled up by a glass cylinder of corresponding shape having a suitable refraction. These two pieces of glass may then be cemented together or joined in any other suitable way. Preferably they are, however, fused or welded together so as to form a uniform unit. Preferably such kinds of glass are chosen which have the same coefficient of expansion, so that during the frequently occurring temperature rises in condenser systems cracking of the glass is prevented.

It will be readily understood that instead of two different kinds of glass three or more kinds may be combined in the manner described. The body of glass built up in this way is then cut as unit, ground and polished. The cylindrical lens is manufactured in a similar manner, which calls for no further description.

I claim as my invention:

An optical projection lens comprising a plurality of portions, one portion being disposed on the optical axis of the lens and being formed of glass of a certain index of refraction and other portions more remote from said optical axis being formed of glass of a different index of refraction, said portions being joined together along non-optical surfaces and said indices of refraction of the various portions being such as to counteract spherical aberration in the lens as a whole.

WALDEMAR EWALD.